2 Sheets—Sheet 1.

G. T. SMITH.
MIDDLINGS PURIFIER.

No. 258,142. Patented May 16, 1882.

Witnesses:
H. N. Low
J. S. Barker.

Inventor:
George T. Smith
by W. W. Dumbleton
and R. Mason atty.

2 Sheets—Sheet 2.

G. T. SMITH.
MIDDLINGS PURIFIER.

No. 258,142. Patented May 16, 1882.

Witnesses:
N. N. Low
J. S. Barker

Inventor:
George T. Smith
by H H Doubleday
and R Mason attys.

UNITED STATES PATENT OFFICE.

GEORGE T. SMITH, OF JACKSON, MICHIGAN.

MIDDLINGS-PURIFIER.

SPECIFICATION forming part of Letters Patent No. 258,142, dated May 16, 1882.

Application filed January 4, 1873.

*To all whom it may concern:*

Be it known that I, GEORGE T. SMITH, of Jackson, in the county of Jackson and State of Michigan, have invented new and useful Improvements in Middlings-Purifiers, of which the following is a specification.

My invention relates to that class of machines in which atmospheric currents are intended, in conjunction with a reciprocating screen, to treat the middlings produced in the reduction of wheat for the separation of the granules of flour and middlings from the particles of bran and light impurities mingled with the mass of middlings in their natural condition, the presence of which renders the unpurified middlings unfit for the production of flour of high grade, while the middlings, after being purified, are of such a nature as to fit them for the production of flour of a higher quality than could be made by processes commonly practiced before my invention.

Figure 1:
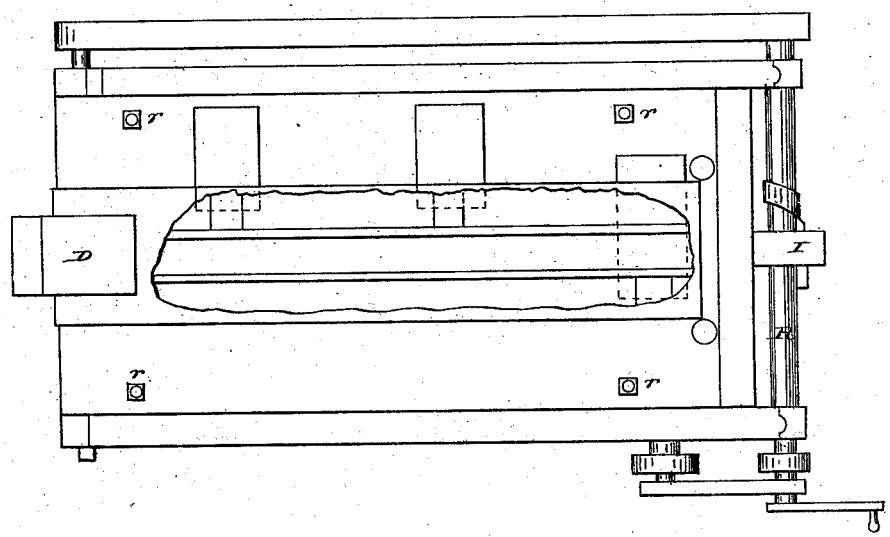
Figure 2:
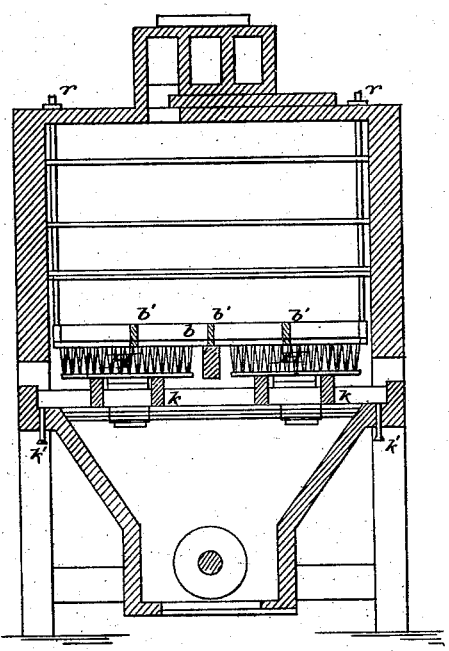
Figure 3:
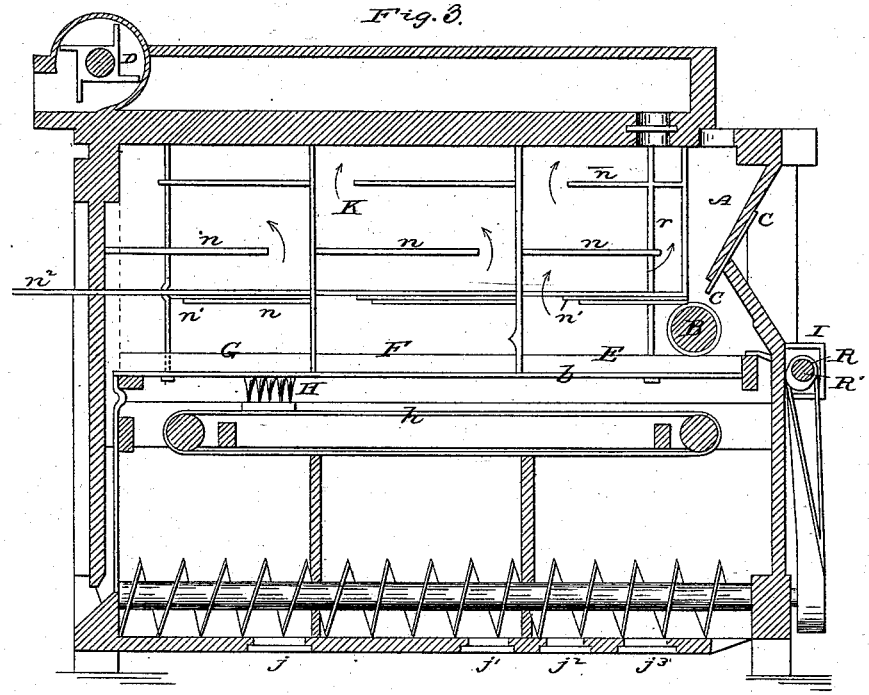
Figure 4:
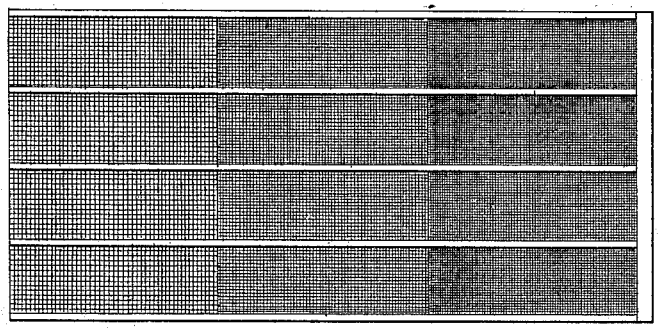

In the annexed drawings, making part of my specification, Figure 1 is a plan or top view of a machine embodying my invention, with a portion of the top of the air-flue broken away. Fig. 2 is a vertical transverse section. Fig. 3 is a vertical longitudinal section; and Fig. 4 is a top plan view of the shaker detached.

The same letters are employed in all the figures in the indication of identical parts.

A represents a hopper, from which the middlings-meal, with all its elements intermingled, is fed by the revolving roller B to the shaker or screen, the amount fed being regulated by a slide, $c$. The screen is made to receive a reciprocating motion by means of an eccentric, R, revolving with a shaft, R', within the inclosing-box I. The screen is suspended by the pivoted links $r\ r$, which leave it free to swing with the movement of the eccentric. This shaker is formed of a frame having a bolting-cloth screen, $b$, tacked to its edges, and furnished also with supporting-ribs $b'\ b'$, which run from the head to the tail-piece of the frame, and have their lower edges in the same plane with the bottom of the sides and end piece, and a similar rib is also shown underneath the cloth. The cloth is secured to the frame and ribs, so as to be maintained in a substantially uniform plane when loaded with the material under treatment.

The cloth-cleaner shown consists of brushes H H, which are attached to and carried by endless belts $h$ in such manner as to be made to sweep the under side of the bolting-cloth, and so detach adhering particles which would otherwise close the meshes of the cloth. The brushes, when in action, are held in position by the ways $k\ k$, on which their backs rest, and the ways may be raised or lowered so as to adjust the brushes by means of the set-screws $k'\ k'$ bearing against the ends of the cross-piece which supports the ways. The belts pass around pulleys at the opposite ends, revolved by power communicated from the prime mover, so as to give constant rotation to belts and brush or brushes.

The screen is formed of bolting-cloths of different degrees of fineness, arranged in sections in such manner that the finest cloth, or cloth of finest meshes, shall be at the head of the screen, and the sections of coarser meshes follow in consecutive order, with increasing coarseness to the tail, where the coarsest cloth is placed. The middlings sifted through the meshes fall on the inclined boards which form the hoppered bottom of the case, and into the conveyer-trough J', in which the spiral conveyer J revolves and moves the middlings until they reach one of the slides $j\ j'\ j^2\ j^3$, drawn out to form an opening, through which they will fall into their appropriate spout, the whole or portions of the whole being remingled, according to the will of the operator, in the adjustment of the slides.

A suction-fan, D, is placed on top of the case, as illustrated, and from the fan-case the casing of the machine is extended, so as to form a continuous wind-trunk, by which the current is confined, and the movement of the air is directed from the time it enters the casing below the screen through the openings C until it enters the eyes of the fan and is expelled through the tubular discharge which forms the mouth of the fan-case, as shown. As the screen becomes coarser, and the material under treatment, as it traverses the upper side of the screen, also becomes coarser as to its residual aggregate, it would oppose less and less resistance to the movement of the air, and consequently a stronger current will pass up through the coarser than through the finer sections of the screen. Provision is made in my machine for modifying this natural action of the currents and placing the disposition of their forces more completely under the command of the operator. To this end the wind-trunk at the top of the casing leading to the fan-case is subdivided, and slides or valves S are placed so as to regulate the draft of air from the body of the casing into the fan-case through openings above different parts of the screen. Vertical partitions $e\ f$ extend from the top of the case nearly to the screen, and so form three air-chambers, E F G, into each of which one of the holes regulated by the valves S opens, so that the operator may at will regulate the draft through the upper, middle, or lower sections of the screen by closing or opening the valve belonging to each.

In order that portions of the dust raised by the air-currents may be deposited, I have arranged shelves $n\ n\ n$ in the several chambers E F G horizontally and in zigzag form, so that the air in passing up, as indicated by the arrows, shall form eddies, in which solid particles carried on its current shall be deposited. Slides $n'\ n'\ n'$ are arranged to control the throat between the lower shelves and the partitions, and these slides may be independently actuated by the rods $n^2$, respectively attached to each.

In operating these machines it is manifestly important that the material under treatment should be supplied to the screen across its entire width in a stratum of uniform thickness; that it should be evenly distributed, and so maintained while traversing the cloth until the particles of middlings reach meshes of size sufficient to permit them to pass and of weight sufficient to cause them to fall against the force of the ascending currents of air, and that the force of these currents should be increased as the material under treatment becomes (by sifting and blowing out lighter and smaller particles) relatively coarser, and so able to sustain a stronger blast without waste; and to secure these results the meshes of the cloth must be kept open, so as to leave the action of the screen and the air unimpeded by their stoppage. These objects are obtained by the combinations of parts in my machine.

Though, independently regarded, none of the elementary parts of my machine are in themselves new, they are brought together in my invention for the first time in the production of a practically efficient machine adapted to the needs of the trade. Not only have the identical elements incorporated into the structure been known in other relations, but other elements have been used as substitutes for those shown in other and somewhat analogous combinations, and I therefore desire that my claims, in referring to the identical elements shown, may be understood to cover as well the use in the same combination of such other things as have been known as the equivalents or proper substitutes for the elements shown.

Thus other devices are known as proper for feeding a material to be treated to a shaking-sieve, so that it shall be distributed across the sieve. I may mention as among the known means a hopper and endless apron, and also a shaking-board, from which the material is carried to the sieve. So, also, wire screens and perforated sheet metal, leather, and parchment have been used as a substitute for bolting-cloth. Screens have been made in sections of different degrees of fineness, and in other cases the cloth screen has been intermediately supported. I am not aware that both forms have been before united in a single screen, and a screen constructed with both features is very important when middlings or other analogous mixed material is to be treated with currents of air. So, also, in other combinations brushes have been used for cleaning bolting cloths and sieves, as also have knockers and wipers and snapping-cords striking the cloth, as well as spheroidal bodies—such as balls, beans, pease, grains of corn and of wheat, &c.—acting on the screen to facilitate the work of sifting.

The uniform action of a gentle current of air on fine middlings is essential to the economical operation of a purifier, since a strong current would carry away too much valuable material, and so diminish, if not destroy, the value of the machine.

I have already in other divisions taken out patents covering some of the important combinations included in this machine. It is the object now to cover all patentable points not covered by any such prior patents.

The maintenance of the cloth in a uniform plane is essential to the performance of accurate work, for if the cloth sags when loaded the middlings will run in a stream down the middle, be exposed to an excessive action of air along the edges, where they are thin, and receive little or none where they flow in a heavy body down the middle. Such a condition of things would interfere with the action of a cloth-cleaner; and though this difficulty was recognized by Cabanes, he suggested no remedy, except to apply such a force of current of air as would hold up both the cloth and its load. This he recommended only as applicable in treating heavy grains, as it is manifest that middlings, if subjected to a blast of such force, would be blown away in excess and wasted.

Not only is it important that the application of air should be uniform across the sieve, so as to act equally on all the material, but it should gradually increase in force as the residuum becomes coarser by the blowing and sifting out of the finer particles. These ends are attained by making the cloth in sections of different degrees of fineness and supporting it intermediately between its edges, so as to hold it flat, and so maintain a uniform distribution across the screen. It is then further desirable that the meshes should be kept open by the cloth-cleaner, and these features I regard as essential to a good purifier.

What I claim as my invention, and desire to secure by Letters Patent, is—

1. In a middlings-purifier, a vibrating screen the cloth of which is formed in sections of increasing coarseness of mesh, and which is provided with supports for the cloth intermediate between its edges to maintain the cloth in plane, substantially as set forth.

2. In a middlings-purifier, a vibrating screen the cloth of which is formed in increasing coarseness of mesh, and which is provided with supports for the cloth intermediate between its edges to maintain the cloth in plane, in combination with a casing forming a wind-trunk, extending from the fan-case to the screen, so as to direct a current of air put in motion by the fan through the entire extent of the screen, whereby the middlings, if fed uniformly across the head of the screen, are subjected to the action of atmospheric currents substantially uniformly across the entire width of the cloth, and which increase in force as the meshes become coarser and coarser and the particles of middlings upon the screen become relatively coarser, substantially as set forth.

3. In a middlings-purifier, a vibrating screen the cloth of which is formed in sections of increasing coarseness of mesh, and which is provided with supports for the cloth intermediate between its edges to maintain the sections of cloth in plane, in combination with a casing which forms a continuous wind-trunk, extending from the fan-case to the screen, so as to direct a current of air put in motion by the fan through the entire extent of the screen, and a cloth-cleaner acting against the surface of the screen for keeping its meshes open, substantially as set forth.

In testimony whereof I have hereunto set my hand this 26th day of December, A. D. 1872.

GEORGE T. SMITH.

Witnesses:
R. A. HYDE,
H. H. DOUBLEDAY.